United States Patent
Nagashima et al.

(10) Patent No.: US 6,579,954 B1
(45) Date of Patent: Jun. 17, 2003

(54) AROMATIC POLYSULFONE RESIN COMPOSITION AND MOLDED ARTICLE CONTAINING THE SAME

(75) Inventors: Tohru Nagashima, Tsukuba (JP); Yoshifumi Yoshida, Minoo (JP); Hiroshi Nakamura, Tsuchiura (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/252,969

(22) Filed: Feb. 19, 1999

(30) Foreign Application Priority Data

Feb. 20, 1998 (JP) ............................................ 10-038505

(51) Int. Cl.$^7$ ............................ C08L 69/00; C08L 81/06
(52) U.S. Cl. ........................ 525/462; 525/437; 525/450; 525/534
(58) Field of Search ................................ 525/437, 450, 525/462, 534

(56) References Cited

U.S. PATENT DOCUMENTS

| 4,051,109 A | | 9/1977 | Barr et al. | |
| 4,108,837 A | * | 8/1978 | Johnson | ........................ 528/126 |
| 4,503,168 A | | 3/1985 | Hartsing, Jr. | |
| 5,008,364 A | * | 4/1991 | Ittemann | ........................ 528/172 |

FOREIGN PATENT DOCUMENTS

| EP | 0 000 733 A1 | 2/1979 |
| EP | 0 113 112 A1 | 7/1984 |
| EP | 0 133 907 A1 | 3/1985 |
| EP | 0133907 | * 3/1985 |
| EP | 0 470 557 A2 | 2/1992 |
| EP | 0 845 501 A1 | 6/1998 |
| JP | 45 39181 | 12/1970 |
| JP | 48 5091 | 2/1973 |
| JP | 48 8257 | 3/1973 |
| JP | 49 13855 | 4/1974 |
| JP | 54 28361 | 3/1979 |
| JP | 60 51739 | 3/1985 |
| JP | 64 70531 | 3/1989 |
| JP | 1256569 | 10/1989 |
| WO | 88/00605 | * 1/1988 |

* cited by examiner

Primary Examiner—Patricia A. Short
(74) Attorney, Agent, or Firm—Birch, Stewart, Kolasch & Birch, LLP

(57) ABSTRACT

A thermoplastic resin composition comprising an aromatic polysulfone resin and at least one resin selected from aromatic polyester resins, wherein the amount of alkali metal which exists in the aromatic polysulfone resin as a terminal phenolate is 50 ppm or less, and molded article thereof. This composition is excellent in heat resistance and melt-mold processability.

12 Claims, No Drawings

AROMATIC POLYSULFONE RESIN COMPOSITION AND MOLDED ARTICLE CONTAINING THE SAME

BACKGROUND OF THE INVENTION

1. Field of the Invention

The present invention relates to a thermoplastic resin composition that is excellent in mechanical properties, heat resistance, moldability, molded-article appearance, etc., and a molded article made therefrom.

2. Description of the Related Art

For the object of improving the chemical resistance of an aromatic polyester resin or improving the impact resistance and flowability during mold processing of an aromatic polysulfone resin, various thermoplastic resin compositions comprising an aromatic polyester resin and an aromatic polysulfone resin have been proposed.

For example, JP-B-45-39181, discloses that chemical resistance and thermal-stress brittleness are improved by mixing an aromatic polysulfone resin with an aromatic polycarbonate resin, compared to each resin alone.

JP-B-49-13855 discloses that a composition comprising an aromatic polysulfone resin and an aromatic polycarbonate resin is excellent in heat-deformation resistance compared with ABS resin.

JP-A-54-28361 discloses that a composition comprising an aromatic polycarbonate resin having a weight average molecular weight of larger than 60000, and an aromatic polysulfone resin is improved in chemical resistance and temperature of deflection under load compared with each resin alone.

JP-A-60-51739 discloses that a composition comprising an aromatic polysulfone resin and an aromatic polycarbonate resin having a specific structure is excellent in mechanical properties, and has improved chemical resistance.

However, in these compositions, there have been problems, such that the originally expected physical properties cannot be obtained. These problems have resulted from (1) decomposition of an aromatic polycarbonate resin or an aromatic polyester resin in the production process by melt-kneading, or (2) difficulties encountered in melt-molding operations such as injection molding, extrusion molding, etc. due to a viscosity fall or gas generation accompanying a decomposition.

SUMMARY OF THE INVENTION

An object of the present invention is to provide a thermoplastic resin composition which is excellent in heat resistance and melt-mold processability.

As a result of extensive studies to solve the above problems, the present inventors found that the above object can be attained with using a composition comprising an aromatic polysulfone resin containing only a small amount of alkali metals existing as terminal phenolate and an aromatic polyester resin.

That is, the present invention relates to a thermoplastic resin composition comprising an aromatic polysulfone resin and at least one resin selected from an aromatic polyester resin, wherein the amount of alkali metal which exists in an aromatic polysulfone resin as a terminal phenolate is 50 ppm or less based on the total amount of the aromatic polysulfone resin, and a molded article thereof.

DETAILED DESCRIPTION OF THE INVENTION

The aromatic polyester resins used in the present invention are a polycarbonate resin, a polyalkylene polyarylate resin, a polyarylate resin, and a liquid crystal polyester resin.

The polycarbonate resin is a homopolymer having a repeating unit represented by the following Formula (1), a copolymer thereof, or a mixture containing such a homopolymer and copolymer.

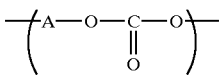

Formula (1)

In Formula (1), A is a divalent aromatic group which is the residue of a dihydric phenol as a raw material. A dihydric phenol which can be used in order to manufacture such an aromatic polycarbonate is a single or plural nucleus aromatic compound containing two hydroxyl groups as functional groups attached directly on the aromatic carbon atoms. Examples of such a dihydric phenol include: bisphenol A, bis(4-hydroxyphenyl)methane, 2,2-bis(4-hydroxy-3-methylphenyl)propane, 2,2-(3,5,3',5'-tetrachloro-4,4'-hydroxyphenyl)propane, 2,2-(3,5,3',5'-tetrabromo-4,4'-hydroxyphenyl)propane, 1,1-bis(4-hydroxyphenyl)cyclohexane, hydroquinone, resorcinol, biphenyl-4,4'-diol, and the like, although the present invention is not limited thereto.

Use of a homo-polycarbonate or co-polycarbonate using at least 30 mol % bisphenol A as a dihydric phenol is preferable in the present invention.

The polyalkylene polyarylate resin used in the present invention is a polyester synthesized from a dihydric alcohol, or a derivative thereof, and an aromatic dicarboxylic acid, or a derivative thereof, and said polyalkylene polyarylate resin is a homopolymer or copolymer having a repeating unit represented by following Formula (2) or a mixture containing such a homopolymer and copolymer.

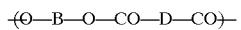

Formula (2)

In Formula (2), B is an alkylene group which is a dihydric alcohol residue of the raw material.

As examples of the dihydric alcohol which can be used in order to manufacture the aromatic polyester, ethylene glycol, propylene glycol, butane-1,4-diol, propane-1,3-diol, 2-ethylpropane-1,3-diol, 2,2-dimethylpropane-1,3-diol, pentane-1,5-diol, hexane-1,6-diol, cyclohexane-1,4-dimethanol, 3-ethylpentane-2,4-diol, 2-methylpentane-2,4-diol, and the like are mentioned, although the present invention is not limited thereto. The term "dihydric alcohol derivative" as used herein means a diester, such as an alkyl- or phenyl-diester of the above dihydric alcohol. Also mixtures thereof can be used in the present invention, if so desired.

In Formula (2), D is a divalent aromatic group which is the residue of an aromatic dicarboxylic acid of a raw material. As examples of the aromatic dicarboxylic acid which can be used in order to manufacture such aromatic polyesters, terephthalic acid, isophthalic acid, phthalic acid, biphenyl-4,4'-dicarboxylic acid, naphthalene-2,6-dicarboxylic acid, oxydiphenyl-4,4'-dicarboxylic acid, ethylenedioxyphenyl-4,4'-dicarboxylic acid, thiodiphenyl-4,4'-dicarboxylic acid, and the like are mentioned, although the present invention is not limited thereto. The hydrogen atom of the aromatic nuclei can be optionally substituted with an alkyl group having 1–6 carbon atoms an alkenyl group having 3–10 carbon atoms, a phenyl group or a halogen atom.

Among the polyalkylene polyarylate resin of the present invention there are included: a polyethylene terephthalate resin containing at least 80% by weight, suitably at least 90% by weight of ethylene-glycol unit based on the dihydric alcohol component, and containing at least 80% by weight, suitably at least 90% by weight of terephthalic acid unit based on the aromatic dicarboxylic acid component;

a polybutylene terephthalate resin containing at least 80% by weight, suitably at least 90% by weight of 1,4-butanediol unit based on the dihydric alcohol component, and containing at least 80% by weight, suitably at least 90% by weight of terephthalic acid unit based on the aromatic dicarboxylic acid component; and a polyethylene naphthalate resin containing at least 80% by weight, suitably at least 90% by weight of ethylene-glycol unit based on the dihydric alcohol component, and containing at least 80% by weight, suitably at least 90% by weight of 2,6-naphthalene dicarboxylic acid unit based on the aromatic dicarboxylic acid component.

The polyarylate resin used in the present invention is a polyester synthesized from dihydric phenol or its derivative, and an aromatic dicarboxylic acid, or a derivative thereof, and is a homopolymer or a copolymer having a repeating unit represented by the following Formula (3), and a mixture containing such a homopolymer or copolymer

  Formula (3)

In Formula (3), E is a divalent aromatic group which is the residue of dihydric phenol of a raw material.

Examples of dihydric phenol which can be used in order to manufacture such a polyarylate resin include: bis(4-hydroxyphenyl)-methane, bis(4-hydroxy-3-methylphenyl)-methane, bis(4-hydroxy-3,5-dichlorophenyl)-methane, bis(4-hydroxy-3,5-dibromophenyl)-methane, bis(4-hydroxy-3,5-difluorophenyl)-methane, bis(4-hydroxyphenyl)-ketone, bis(4-hydroxyphenyl)-sulfide, bis(4-hydroxyphenyl)-sulfone, 4,4-dihydroxydiphenylether, 1,1-bis(4-hydroxyphenyl)-ethane, 2,2-bis(4-hydroxyphenyl)-propane, 2,2-bis(hydroxy-3-methylphenyl)-propane, 2,2-bis(4-hydroxy-3-chlorophenyl)-propane, 2,2-bis(4-hydroxy-3,5-dichlorophenyl)-propane, 2,2-bis(4-hydroxynaphtyl)-propane, bis(4-hydroxyphenyl-phenylmethane, bis(4-hydroxyphenyl)-diphenylmethane, and bis(4-hydroxyphenyl)-4-methylphenylmethane, 1,1-bis(4-hydroxyphenyl)-2,2,2-trichloroethane, bis(4-hydroxyphenyl)-4-chlorophenylmethane, 1,1-bis(4-hydroxyphenyl)-cyclohexane, bis(4-hydroxyphenyl)-cyclohexylmethane, 4,4-dihydroxydiphenyl, 2,2-dihydroxydiphenyl, dihydroxynaphthalenes such as 2,6-dihydroxynaphthalene, hydroquinone, resorcinol, 2,6-dihydroxytoluene, 2,6-dihydroxychlorobenzene, and 3,6-dihydroxytoluene. The derivative of dihydric phenol is a diester, such as alkyl or phenyl diester of the above dihydric phenol, and mixtures of the dihydric phenols and derivatives thereof may be used if so desired.

In Formula (3), D is a divalent aromatic group which is the residue of an aromatic dicarboxylic acid of a raw material, and examples thereof are as above-mentioned. For example, among them, a suitable polyarylate resin contains at least 80% by weight, preferably at least 90% by weight of 2,2-bis(4-hydroxyphenyl)-propane based on the dihydric phenol component, and contains terephthalic acid and isophthalic acid as an aromatic dicarboxylic acid unit.

The liquid crystal polyester used in the present invention is a polyester called thermotropic liquid crystalline polymer, and examples thereof include;

(1) a polyester of a combination of an aromatic dicarboxylic acid, aromatic diol and aromatic hydroxycarboxylic acid, (2) a polyester of a combination of different kinds of aromatic hydroxycarboxylic acids, (3) a polyester of a combination of an aromatic dicarboxylic acid and aromatic diol, (4) a polyester obtained by reacting an aromatic hydroxycarboxylic acid with a polyester such as polyethylene terephthalate, and the like. And, each of them forms an anisotropic molten material at a temperature of not higher than 400° C. In place of these aromatic dicarboxylic acid, aromatic diol and aromatic hydroxycarboxylic acid, ester-forming derivatives thereof are also sometimes used.

Examples of the repeating structural unit of the above-described liquid crystal polyester include, but are not limited to, the following units.

Repeating Structural Units Derived From Aromatic Hydroxycarboxylic Acids:

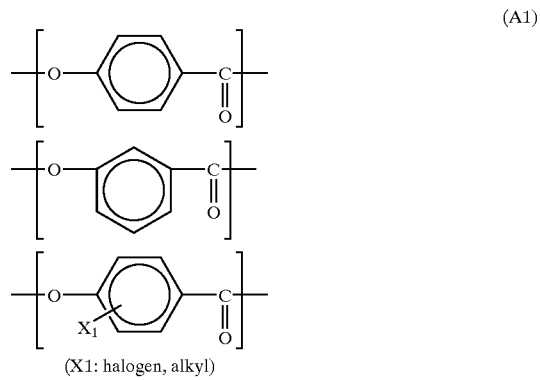

(X1: halogen, alkyl)

Repeating Structural Units Derived From Aromatic Dicarboxylic Acids:

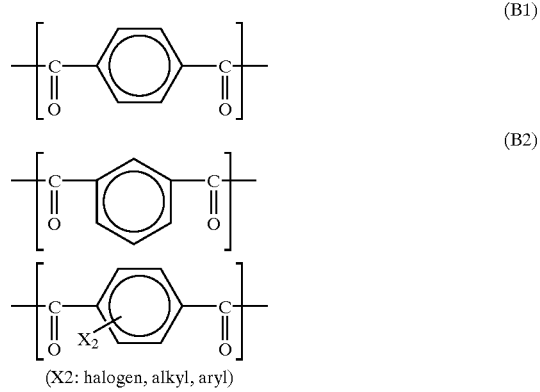

(X2: halogen, alkyl, aryl)

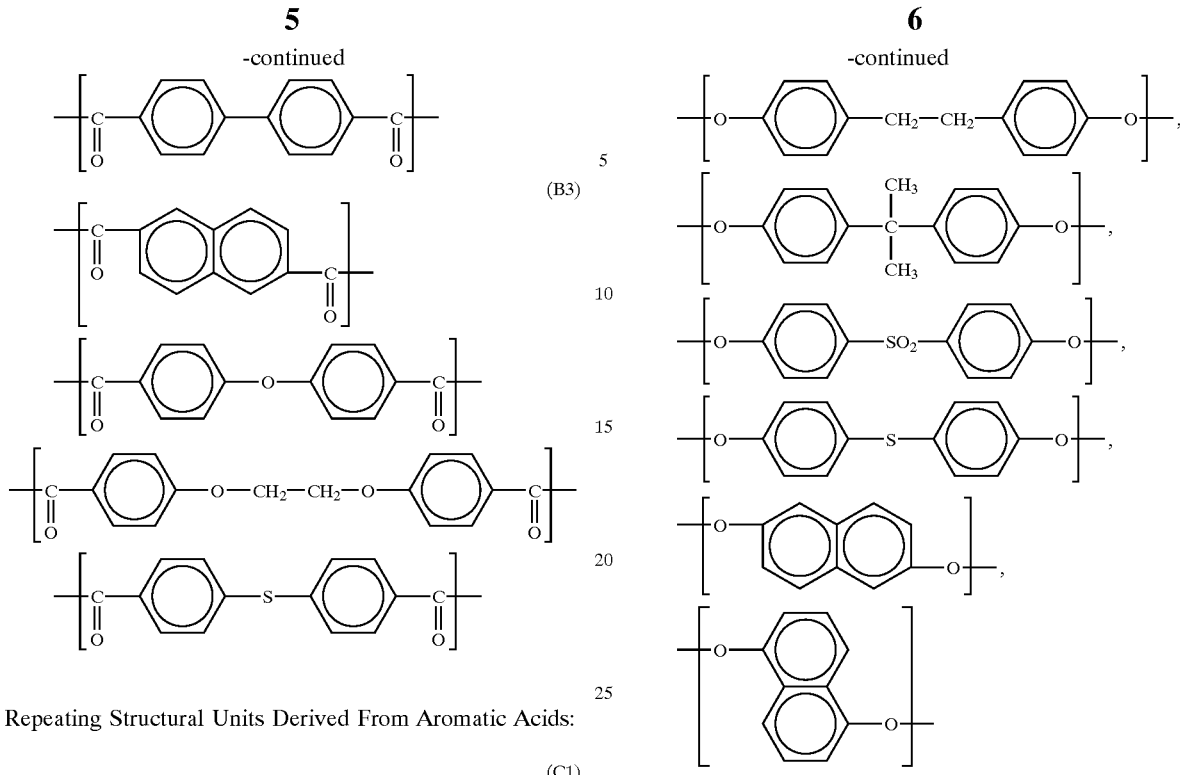

(B3)

Repeating Structural Units Derived From Aromatic Acids:

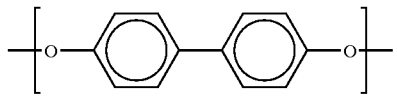
(C1)

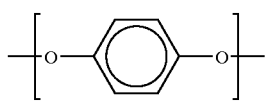
(C2)

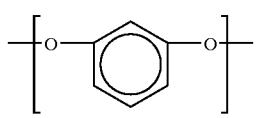
(C3)

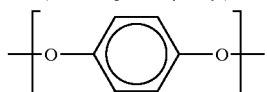
(X2: halogen, alkyl, aryl)

(X3: H, halogen, alkyl)

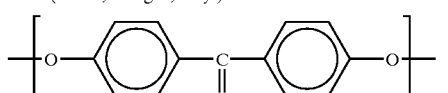

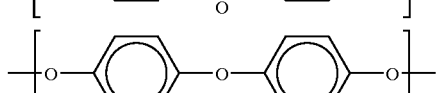

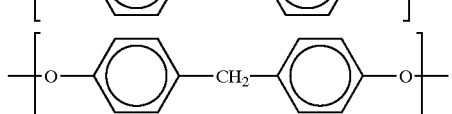

Repeating Structural Units Derived From Diols:

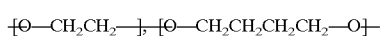

A liquid crystal polyester which is particularly preferable in view of a balance between heat resistance, mechanical properties and processability is one which comprises the repeating structural unit represented by ($A_1$) in an amount of at least 30% by mol.

Concretely, liquid crystal polyesters containing repeating structural units in combinations represented by the following formulae (a) to (f) are preferable.

(a): ($A_1$), ($B_1$) or a mixture of ($B_1$) and ($B_2$), ($C_1$).

(b): ($A_1$), ($A_2$).

(c): Combination (a) wherein a part of ($A_1$) is replaced by ($A_2$).

(d): Combination (a) wherein a part of ($B_1$) is replaced by ($B_3$).

(e): Combination (a) wherein a part of ($C_1$) is replaced by ($C_3$).

(f): Combination (b) to which structural units ($B_1$) and ($C_1$) are further added.

Liquid crystal polyesters having the basic structures (a) and (b) are described respectively in JP-B-47-47870 and JP-B-63-3888.

The aromatic polysulfone resin used in the present invention comprises an arylene unit, an ether bond and a sulfone bond as components thereof. The arylene unit is defined as a polyarylene compound located disorderly or orderly together with an ether bond and a sulfone bond. The following repeating units are included herewith as typical examples thereof. However, the present invention is not limited thereto.

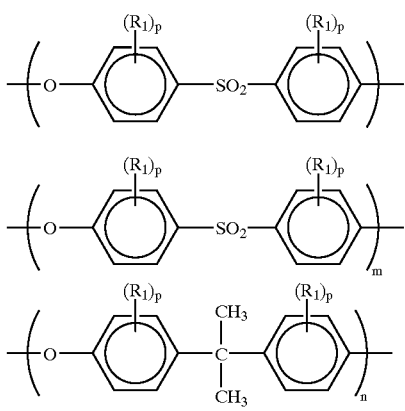

(I)

(II)

The compound (II) contains a random copolymer. In the formula, $R_1$ represents an alkyl group having 1–6 carbon atoms, an alkenyl group having 3–10 carbon atoms, a phenyl group, or a halogen atom; p is an integer of 0 to 4; m and n represent average number of repeating units, and m and n are within the range of 0.1 to 100; each $R_1$ on the same or different nucleus may differ mutually; p may differ each mutually.

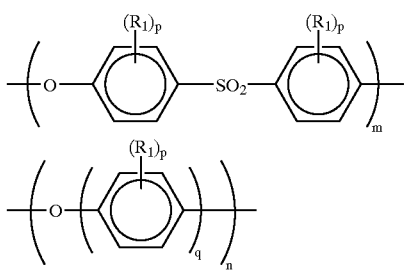

(III)

This compound contains a random copolymer. In the formula, $R_1$ represents an alkyl group having 1–6 carbon atoms, an alkenyl group having 3–10 carbon atoms, a phenyl group, or a halogen atom; p is an integer of 0 to 4; q, m and n represent average number of repeating units, q is a numeral of 1 to 3, m and n are within the range of 0.1 to 100; each $R_1$ on the same or different nucleus may differ mutually; and each p may differ mutually.

As for the aromatic polysulfone resin used in the present invention, the value of (m/m+n) in the repeating unit represented by (II) or (III) is preferably not less than 0.8. Moreover, q in the structural unit of (III) is preferably 1. Among them, a polysulfone having the repeating units of (I) and (II) is preferable, and a polysulfone having the repeating unit of (I) is more preferable.

The aromatic polysulfone resin used in the present invention contains the alkali metal, which exists as terminal phenolate in an amount of 50 ppm or less, preferably not more than 40 ppm and not less than 5 ppm, based on the total amount of the aromatic polysulfone resin. When the alkali metal which exists as terminal phenolate is more than 50 ppm, the heat resistance of the composition is inferior, and it is not preferable. Terminal structures other than phenolate are determined according to the process of each resin. For example, Cl, OH, OR (R is an alkyl group), and the like are mentioned, but the present invention is not limited thereto.

Examples of the method for obtaining aromatic polysulfone resins containing alkali metal which exists as terminal phenolate in an amount of 50 ppm or less based on the total amount of the aromatic polysulfone resin are:

a method of converting the end groups to Cl, in case of dehydrochlorination polycondensation of a divalent phenolate (obtained, for example, by heat-melting of dihydric phenol, such as 4,4'-dihydroxydiphenylsulfone and bisphenol A, with potassium carbonate or sodium hydroxide, with stirring) and a dichloro compound (for example, 4,4'-dichlorodiphenylsulfone) by charging excess amount of the dichloro compound in the production process, maintaining satisfactory polymerization time, and completing the reaction;

a method of converting the end groups to OR (R is an alkyl group) by charging a compound represented by RCl (R is an alkyl group) in the second half of polycondensation; and a method of converting the end groups to hydroxyl groups by washing the aromatic polysulfone resin containing terminal phenolates more than 50 ppm with water or aqueous acetic-acid solution.

The amount of the aromatic polyester resin in the resin composition of the present invention compounds is 5–55% by weight on the basis of the total weight of the aromatic polysulfone resin and the aromatic polyester resin, more suitably 25–45% by weight.

In the present invention, if necessary, one or more of the types of typical additives described below can be added to the compositions of the present invention.

Fibrous or needlelike reinforcements such as glass fiber, silica alumina fiber, alumina fiber, carbon fiber, aluminum borate whisker, etc.; inorganic fillers, such as talc, mica, clay, glass bead, etc.; mold release agents, such as a fluoropolymer, metallic soaps, etc.; colorants, such as dye, pigment, etc.; antioxidant, heat stabilizer, ultraviolet absorber, antistatic agent, and a surfactant.

Moreover, there can be added a small amount of thermoplastic resin, for example, polyethylene, polypropylene, polyvinyl chloride, ABS resin, polystyrene, methacrylic resin, polyamide, polyester, polyphenylene sulfide, polyetherketone, polyphenylene ether and modifications thereof, polyether imide, and the like, either alone or in combinations of two or more of them. There can also be added a small amount of thermosetting resin, for example, phenol resin, epoxy resin, cyanate resin, isocyanate resin, polyimide resin, and the like, either alone or in combination of two or more of them. A small amount of rubber component can also be added if so desired.

The formulation method of the raw material for obtaining a resin composition of the present invention is not especially limited. Usually, an aromatic polycarbonate resin, an aromatic polysulfone resin, if necessary, reinforcements, such as glass fiber, an inorganic filler, a mold release agent and a heat stabilizer, etc., are mixed with a Henschel mixer, a tumbling mixer, or the like, and melt-kneaded using an extruder. As a method of melt-kneading, it is possible that all raw materials are mixed together and fed to an extruder. It is also possible that raw materials such as inorganic fillers and reinforcements like glass fiber etc., can be fed separately from raw materials mainly that are composed of resins.

The preparation method of a molded article molded made from or by using the thermoplastic resin composition of the present invention is not especially limited. As methods for melting, solidifying and shaping resins, an extrusion molding, injection molding, a blow molding and the like are mentioned. Among them, especially injection molding is preferably used. Further, the extrusion-molded article may be processed by cutting or pressing if so desired.

The thermoplastic resin composition of the present invention can be suitably used for manufacturing parts for a car, an airplane, etc., industrial instruments, household electric appliances products, tableware and medical instruments, OA/AV instruments, and electron/electronic parts, for example, IC trays, IC sockets, etc., for which heat resistance is especially required.

EXAMPLES

The present invention will be illustrated by the following examples, which do not limit the scope of the present invention in any way.

(1) Amount of the Alkali Metal Which Exists as Terminal Phenolate

Aromatic polysulfone resin was dissolved in dimethylformamide, and an excess amount of para-toluene sulfonic acid was added. The terminal amount of phenolate is measured by back titration of the residual amount of consumption using a potassium methoxide/toluene methanol solution in a potentiometric-titration device, with the amount of alkali metal being reduced to potassium.

(2) Melt Viscosity:

After drying 2.3 g of the compositions at 120° C. for 8 hours, the melt viscosity was measured using Koka type flow tester (Shimadzu CFT-500) in the condition of 350° C., 50 kg of load, 1 mm of die diameter and 10 mm of die length.

Referential Example 1

In a 0.5 L flask made of SUS316L equipped with a stirrer, a nitrogen introduction pipe, a thermometer and a condenser having a receiver at the exiting end, 4,4'-dihydroxydiphenylsulfone 100.11 g, 4,4'-dichlorodiphenylsulfone 119.92 g and diphenylsulfone 196.00 g were charged. The temperature was raised to 180° C., with circulating nitrogen gas in the flask, and the monomers were melted. Then, 57.50 g of anhydrous potassium carbonate was added, the temperature was raised gradually to 290° C., and reacted for 1 hour at that temperature. The reaction liquid was taken out and solidifying with cooling was carried out to room temperature (~25° C.), and the reaction mixture was then ground until the maximum particle diameter thereof became 1 mm or less (using a small grinder SKM10R (KYORITSU RIKO Co.LTD.)).

To 150 g of the above ground reaction mixture in 3 L flask, 1 L of 70° C. hot-water was added, and the mixture stirred with an anchor type agitating blade for 3 hours, and a powder-like mixture of the polymer and diphenylsulfone was filtrated. Then, a solvent mixture of acetone 1600 ml, methanol 1300 ml and water 140 ml, and the powder-like mixture were charged into 5 L flask. After stirring with an anchor type agitating blade for 3 hours, and with repeating this operation with replacing the solvent mixture 3 times, washing by 4 L of water twice, and drying at 150° C. in a hot-blast circulation oven for 8 hours, 60 g of a polymer was obtained. The amount of potassium which exists in the polymer as terminal phenolate was measured with the above described method, and was found to be 65 ppm, in the obtained polymer.

Referential Example 2

The same operation as in Referential Example 1 was conducted except that the reaction time after raising the temperature to 290° C. was set to be 1.5 hours. After taking out reaction liquid, about 60 g of a polymer was obtained by the same operation and technique as in Referential Example 1. The amount of potassium which exists in the obtained polymer as terminal phenolate was 35 ppm, when measured according to the above described method.

Referential Example 3

4,4'-dihydroxydiphenylsulfone and diphenylsulfone were charged in the same manner as with Referential Example 1, except that 121.07 g of 4,4'-dichlorodiphenylsulfone was charged. The temperature was raised to 180° C., with circulating nitrogen gas in the flask, and the monomers were melted. Then, 57.50 g of anhydrous potassium carbonate was added, the temperature was raised gradually to 290° C., and reacted for 3 hour at that temperature. After the reaction liquid was taken out, about 60 g of a polymer was obtained by the same operation and technique as in Referential Example 1. The amount of potassium which exists in the obtained polymer as terminal phenolate, when measured according to the above method, was 10 ppm.

Comparative Example 1

26 g of aromatic polycarbonate resin (Sumitomo Dow Limited, trade name CARIBRE 200-3), and 39 g of the aromatic polysulfone resin obtained in Referential Example 1 were dried at 120° C. for 8 hours, then it was supplied to a twin axis melt-kneading machine (Toyo Seiki Seisakusho Ltd., Laboplastmill 20R200) set to 340° C., and kneaded (150 rpm). After 5 minutes, about 3 g of the resin composition was taken out, and the kneading was continued another 10 minutes. The whole quantity was collected, and the melt viscosity of each resin composition was measured by the above method.

Example 1

Except for the fact that the aromatic polysulfone resin obtained in Referential Example 2 was utilized, the kneading and the measurement of melt viscosity were conducted as the same manner with Comparative Example 1.

Example 2

Except for the fact that the aromatic polysulfone resin obtained by Referential Example 3 was utilized, the kneading and the measurement of melt viscosity were conducted in the same manner as with Comparative Example 1.

The melt viscosity of the above composition after kneading is shown in Table 1. The respective melt viscosities are almost equal at an early stage of the kneading (i.e. 5 min.). And the melt viscosities after 15 minutes melt-kneading of Examples 1 & 2 do not change, while in contrast that of Comparative Example 1 fell down remarkably.

From these results, it can be seen and understood that in case of a composition comprising an aromatic polysulfone resin containing an alkali metal which exists as terminal phenolate in an amount of more than 50 ppm, and an aromatic polyester resin, a stable melt-mold processing thereof is difficult, due to the viscosity thereof falling at the time of melt-molding. On the other hand, in the case of a composition comprising an aromatic polysulfone resin containing alkali metal, which exists as terminal phenolate in an amount of about 50 ppm or less and an aromatic polyester resin, it can be seen and understood that a stable melt-mold processing thereof can be conducted therewith, since no viscosity falling off occurs therewith during melt-molding.

TABLE 1

| (kneading time) | Melt viscosity (poise) | |
|---|---|---|
|  | 5 minutes | 15 minutes |
| Comparative Example 1 | 2100 | 1200 |
| Example 1 | 2330 | 2270 |
| Example 2 | 2280 | 2120 |

The thermoplastic resin composition and the molded article of the present invention are excellent in heat resistance or mechanical physical properties, and the melt-mold processing through which they are obtained can be easily carried out.

What is claimed is:

1. A thermoplastic resin composition comprising 95–45% by weight of an aromatic polysulfone resin and 5–55% by weight of an aromatic polycarbonate resin, wherein an alkali metal exists in the aromatic polysulfone resin as a terminal phenolate, in an amount of 50 ppm or less, based on the total amount of the aromatic polysulfone resin.

2. The thermoplastic resin composition according to claim 1, wherein the alkali metal that exists as terminal phenolate is not more than 40 ppm and not less than 5 ppm, based on the total amount of the aromatic polysulfone resin.

3. The thermoplastic resin composition according to claim 2, wherein the polycarbonate resin is a co-polycarbonate or a homo-polycarbonate containing at least 30 mol % of bisphenol A unit.

4. The thermoplastic resin composition according to claim 2, wherein the aromatic polysulfone resin contains a repeating unit represented by the following formula, in an amount of more than 80% by mol,

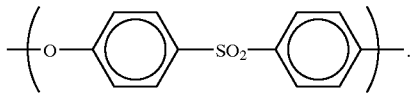

5. The thermoplastic resin composition according to claim 1, wherein the polycarbonate resin is present in the thermoplastic resin composition in an amount of 25–45% by weight.

6. The thermoplastic resin composition according to claim 1, wherein the polycarbonate resin is a co-polycarbonate or a homo-polycarbonate containing at least 30 mol % of bisphenol A unit.

7. The thermoplastic resin composition according to claim 1, wherein the aromatic polysulfone resin contains a repeating unit represented by the following formula, in an amount of more than 80% by mol,

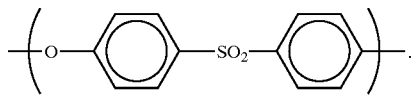

8. A molded article containing a thermoplastic resin composition comprising 95–45% by weight of an aromatic polysulfone resin and 5–55% by weight of an aromatic polycarbonate resin, wherein an alkali metal exists in the aromatic polysulfone resin as a terminal phenolate, in an amount of 50 ppm or less, based on the total amount of the aromatic polysulfone resin.

9. The molded article of claim 8, wherein the alkali metal that exists as terminal phenolate is not more than 40 ppm and not less than 5 ppm, based on the total amount of the aromatic polysulfone resin.

10. The molded article of claim 8, wherein the polycarbonate resin is present in the thermoplastic resin composition in an amount of 25–45% by weight.

11. The molded article of claim 8, wherein the polycarbonate resin is a co-polycarbonate or a homo-polycarbonate containing at least 30 mol % of bisphenol A unit.

12. The molded article of claim 8, wherein the aromatic polysulfone resin contains a repeating unit represented by the following formula, in an amount of more than 80% by mol,

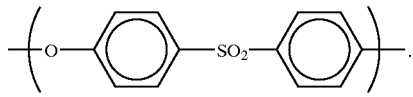

* * * * *